United States Patent [19]

Truebe

[11] Patent Number: 5,730,086
[45] Date of Patent: Mar. 24, 1998

[54] APPARATUS FOR A FISH DETERRENT AND GUIDE

[76] Inventor: Jonathan Truebe, 4 Tuftonboro Neck Rd., Mirror Lake, N.H. 03853

[21] Appl. No.: 831,221

[22] Filed: Apr. 2, 1997

[51] Int. Cl.⁶ .......................... A01K 61/00; A01M 29/02
[52] U.S. Cl. .......................... 119/219; 367/139
[58] Field of Search .......................... 119/219, 220; 367/139, 141, 143

[56] References Cited

U.S. PATENT DOCUMENTS

| | | | |
|---|---|---|---|
| 4,030,063 | 6/1977 | Wallen | 367/143 |
| 4,256,014 | 3/1981 | Kroger | 91/216 B |
| 4,646,276 | 2/1987 | Kowalewski et al. | 367/139 |
| 4,922,468 | 5/1990 | Menezes | 367/139 |
| 4,932,007 | 6/1990 | Suomala | 367/139 |
| 4,955,005 | 9/1990 | Loeffelman | 367/139 |
| 5,448,968 | 9/1995 | Ostile | 119/220 |
| 5,602,799 | 2/1997 | Hecker et al. | 367/139 |

OTHER PUBLICATIONS

F.R. Knudsen, et al, Journal of Fish Biology, Awareness Reactions and Avoidance Responses to Sound In Juv. Atlantic Salmon (1992) 40 523–534.

F.R. Knudsen et al. Journal of Fish Biology, Avoidance Responses to Low Frequency Sound in Downstream Migrating Atlantic Salmon Smolt, (1994) 45 227–233.

G.T. Haymes et al, Can. J. Fish. Aquat. Sci., Exclusion of Adult Alewife Using Low-Frequency Sound for Application at Water Intakes (1986) 43 855–862.

*Primary Examiner*—Gene Mancene
*Assistant Examiner*—Yvonne R. Abbott

[57] ABSTRACT

An improved fish deterrent and guide utilizing generally a pneumatic oscillator (1) and oscillated plate (9), to generate water particle motion (low frequency sound or infrasound) and specifically water particle accelerations to which fish exhibit an avoidance response. The invention is reliable, reasonably portable and deployable, low-maintenance, and tunable to produce the desired water particle motion. Reliability is due to the piston (4) being cushioned by air at the end of each stroke and redirected without impacting the casing. The operation of the apparatus is easily verified from the water surface by inspection of the backpressure regulator (13). The apparatus is tunable through adjustment of the inlet pressure, backpressure, and size, shape, and mass of the oscillated plate. Adjustment of these items through a lab and field testing procedure produce water particle motion with the correct frequency, amplitude, and energy to guide fish to a desired location or prevent their entrance into potentially dangerous areas.

11 Claims, 1 Drawing Sheet

1

APPARATUS FOR A FISH DETERRENT AND GUIDE

BACKGROUND—FIELD OF INVENTION

This invention relates to modifying the behavior of fish. Specifically, it modifies fish behavior by using oscillating water particle acceleration, which is a component of water particle motion, low frequency sound, or infrasound.

BACKGROUND—DESCRIPTION OF PRIOR ART

With the decline of certain fish stocks, people are placing more emphasis than ever on the value of fish. Government agencies, environmental groups, and the general public are campaigning to protect our fishery resource. Part of this decline is due to the man-made hazards to which fish are exposed. These hazards may include hydroelectric power plants, municipal water intakes, thermal power plants, and irrigation systems. Fish can suffer high mortalities when they come in contact with pumps or turbines, when they are subject to temperature variations induced by plants, or when they are pumped through irrigation systems and discharged onto fields.

In order to exclude fish from these areas, and increase their chances of survival, there are a number of devices available. These devices and their advantages and disadvantages are described in Taft, E. P. 1986. *Assessment of Downstream Migrant Fish Protection Technologies* described in Taft, E. P. 1986. *Assessment of Downstream Migrant Fish Protection Technologies for Hydroelectric Application.* Stone and Webster Engineering Corporation. Electric Power Research Institute, Palo Alto, Calif. The exclusion devices can be broken down into physical barriers and behavioral deterrents. Physical barriers work by limiting the opening size of the intake such that a certain fish species or life stage of fish can not enter. This includes barriers such as closely spaced bar racks, traveling screens, and fixed screens. The disadvantages of these structures are that they are difficult and expensive to construct and maintain. They can also limit the water flow into the intake, thereby limiting power production or quantity of water available. These structures can also result in impingement of fish on the intake.

Behavioral deterrents rely on fish behavior to divert fish from an intake. These deterrents include lights, electric fields, velocity/turbulence, and sound deterrents. Underwater lights (including strobes) are species-specific, and the visibility of lights, and therefore effectiveness, is reduced in turbid water. There are three major concerns with underwater electric fields. They present a human safety concern, are variable depending on the conductivity of water, and the fields that are effective for some fish species may be lethal to other species. Velocity/turbulence deterrents, such as air bubble curtains and water jets, are energy intensive and don't affect some species.

Sound is an additional means of modifying the behavior of fish. An overview of the current state of the art sound deterrent systems is provided in Carlson, T. J. 1994. *Use of Sound for Fish Protection at Power Production Facilities: A Historical Perspective of the State of the Art.* Battelle, Pacific Northwest Laboratories. U.S. DOE Bonneville Power Administration, Portland, Oreg.

There are several disadvantages to recent sound deterrent systems. One of the disadvantages of underwater sound deterrents is that it is difficult to establish an uninterrupted barrier, and thus create a continuous lead for fish to follow away from the intake. Also, the frequency and amplitude of the sound wave must be tuned for each individual species, and even life stage, of fish. Underwater sound systems may be categorized into either high frequency systems or low frequency water particle motion or infrasound systems, depending on the specific species of fish to control. Low frequency sound systems have been proven to elicit an avoidance response in Atlantic salmon smolts, Atlantic cod, and perch in Knudsen, F. R., P. S. Enger, and O. Sand. 1992. *Awareness Reactions and Avoidance Responses To Sound in Juvenile Atlantic Salmon Smolt, Satmo salar L.* Journal of Fish Biology. 40: 523–534. To be effective, a sound deterrent must be able to create the same sound repeatedly for extended periods of time without breakdown. The problems with the system Sand developed were that it was not mechanically reliable and that it involved the risk of electrical shock. Another type of low frequency sound generators is the projector. It uses electronics for greater reliability, but this type of system is large and expensive.

OBJECTS AND ADVANTAGES

Accordingly, several objects and advantages of my invention are:

to provide a cost effective fish deterrent and guide.

to provide a tunable fish deterrent and guide to achieve a certain water particle acceleration in the low frequency range which is effective with various species and life stages of fish.

to provide a tunable fish deterrent and guide to establish a continuous barrier to the fish.

to provide a mechanically reliable fish deterrent and guide.

to provide a fish deterrent and guide whose operation can be remotely monitored from the water surface.

to provide a reasonably portable and deployable fish deterrent and guide.

to provide a fish deterrent and guide safe from the hazard of electrical shock.

to provide a fish deterrent and guide which is easy to maintain.

Further objects and advantages of my invention will become apparent from a consideration of the drawings and ensuing description.

REFERENCE NUMERALS IN DRAWING

Figure 1:
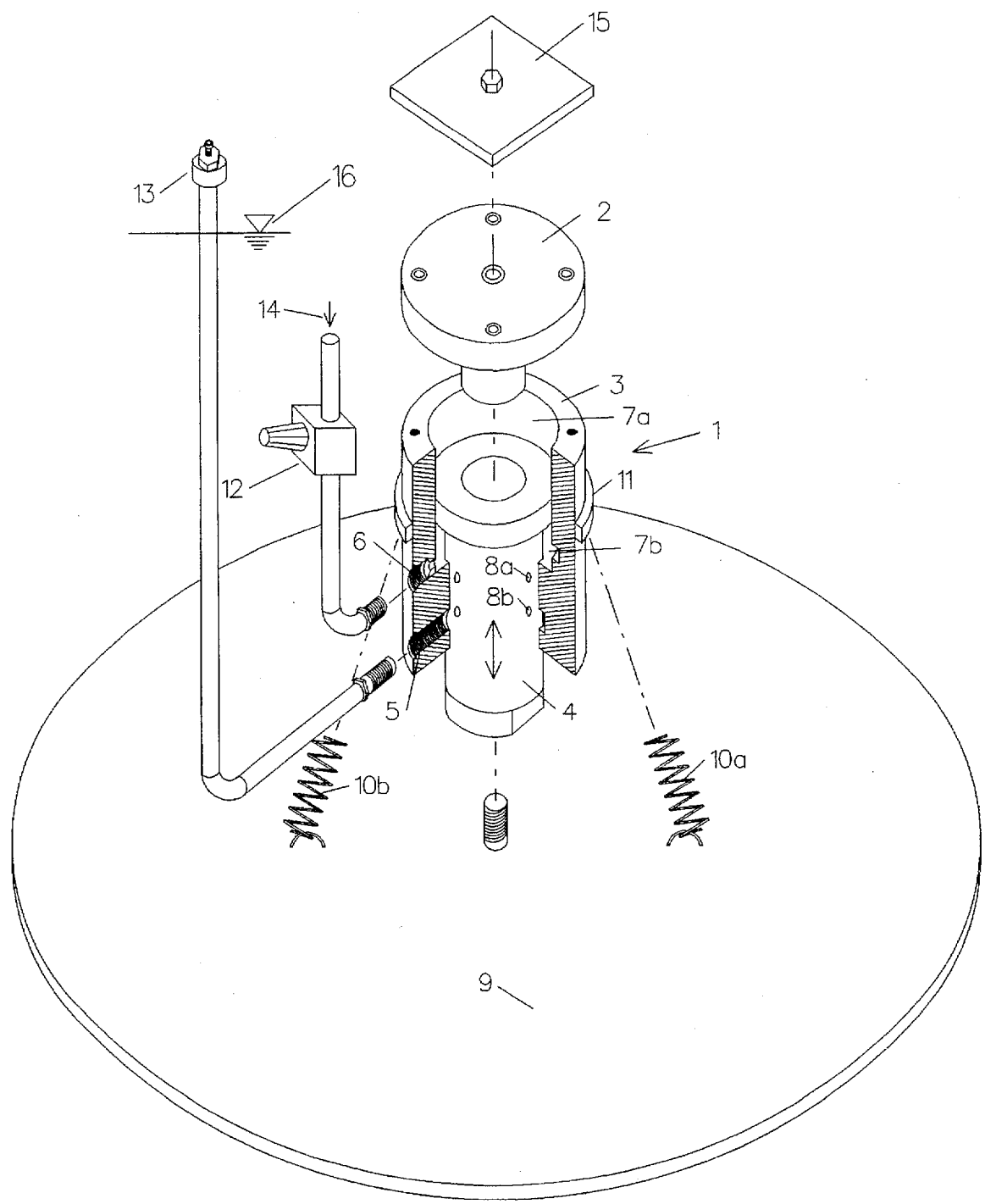
FIG. 1 is an exploded perspective view of the fish deterrent and guide.

| 1 | Pneumatic Oscillator | 2 | Housing Cover |
|---|---|---|---|
| 3 | Housing | 4 | Stepped Piston |
| 5 | Exhaust Port | 6 | Inlet Port |
| 7a, 7b | Housing Chambers | 8a, 8b | Piston Channels |
| 9 | Oscillated Plate | 10a, 10b | Self-Starting Springs |
| 11 | Spring Retaining Clip | 12 | Inlet Pressure Regulator |
| 13 | Backpressure Regulator | 14 | Compressed Air Supply |
| 15 | Mounting Plate | 16 | Water Surface |

SUMMARY

This invention is a behavioral deterrent to exclude fish from potentially dangerous areas. It uses a pneumatic oscillator to produce low frequency water particle motion. By conducting lab and field tests with the apparatus, it is tuned to provide a continuous barrier to a specific species and life stage of fish.

DESCRIPTION OF INVENTION

A typical embodiment of the fish deterrent and guide is illustrated in FIG. 1. At the center of the assembly is a pneumatic oscillator 1, such as the piston vibrator invented by Dietrich Kroger, U.S. Pat. No. 4,256,014. In the U.S., this piston vibrator is distributed by Martin Engineering Co., Neponset, Ill. as the NTK series. This type of pneumatic oscillator is typically used for feeding particulate materials and parts, screening of materials, and compaction and fatigue testing. The pneumatic oscillator is relatively small, with the NTK 25 series measuring 2.5 inches in diameter with a maximum length of 7.56 inches. This small size facilitates handling and deployment.

Pneumatic oscillator 1 consists of a housing cover 2, a cylindrical housing 3, a freely floating stepped piston 4, an exhaust port 5 in the housing, and an inlet port 6 in the housing. Housing 3 contains two chambers, a chamber 7a above stepped piston 4 and a chamber 7b between housing 2 and stepped piston 4. Stepped piston 4 includes internal channels 8a and 8b. Stepped piston 4 is bolted to an oscillated plate 9 which is fabricated from a plywood disk. Two self-starting springs 10 attach housing 2 to oscillated plate 9. The self-starting springs 10 are fastened to housing 2 by a spring retaining clip 11. An inlet pressure regulator 12 is positioned between a compressed air supply 14 and inlet port 6. A backpressure regulator 13 is connected to exhaust port 5. Backpressure regulator 13 is located above a water surface 16. This allows the pneumatic oscillator to develop the full force at atmospheric pressure. The air escaping through backpressure regulator 13 also provides a remote guide as to whether the oscillator is operating properly. The fish deterrent and guide assembly is suspended underwater by attachment to a mounting plate 15. Mounting plate 15 may subsequently be attached to a substantially rigid structure, such as a piling or other rigid frame. Also, the apparatus can be attached to the bottom of a float that has a substantial mass. Although the apparatus is shown oriented in the vertical direction, the use of self-starting springs permit operation in any orientation.

The use of the above mentioned parts permits the assembly of a cost-effective fish deterrent and guide. The pneumatic oscillator is an off-the-shelf item that needs no additional machining or fabrication, which makes the cost of the system economical.

OPERATION OF INVENTION

The fish deterrent and guide will begin operation when compressed air at a pressure between 30 and 150 psi is supplied to the apparatus. The use of compressed air reduces the risk of electric shock with this system.

The compressed air passes through the pressure regulator, where it is throttled to an appropriate pressure. It then advances through the inlet valve of the pneumatic oscillator, and into chamber 7b. When chamber 7b is pressurized, the piston is forced toward the housing cover. At a point in the piston stroke, the ports and channels in the piston redirect the inlet pressure into chamber 7a, and chamber 7b is evacuated. This process is repeated, causing the piston to oscillate back and forth. Since the chamber at the end of the piston is always pressurized before the end of the piston stroke, the piston never comes in contact with the housing cover. Rather, a layer of compressed air cushions the redirection of the piston. This reduces mechanical wear and extends the life of the system. These particular pneumatic oscillators have shown years of trouble-free operation in service with higher impact loads than that of the preferred embodiment.

Prior to installing the water particle motion generators on site, a series of lab and field tests were performed to determine the benchmark characteristics of the pneumatic oscillator. These characteristics were then modified to maximize the avoidance response for the fish species and life stage desired.

The first set of tests configured the water particle motion generator for Atlantic salmon smolts. For the lab test, an electronic signal analyzer was used to monitor the frequency and relative energy developed by the water particle motion generator with the generator operating in a calm body of water. The disk diameter, disk mass, disk edge conditions, inlet pressure and backpressure were adjusted to produce water particle force, frequency, and acceleration readings which were the most effective deterrent. It has been shown that particle accelerations of at least $10^{-2}$ ms$^{-2}$ at 5–10 Hz have yielded the greatest avoidance response in Atlantic salmon smolts.

The water particle motion generator allowed modification to a variety of generator parameters in order to get a suitable final output signal. The amplitude was adjusted by modifying the input pressure, backpressure, disk edge conditions, and disk diameter. The frequency of the water particle motion was adjusted by changing the disk diameter and disk mass. The imparted energy on the water was changed by varying the disk diameter and input pressure. The shape of the edge of the disk (sharp, cupped, or rounded) also changed the amount of energy imparted on the water and the size of the influence field of this water particle motion. This set of adjustments produced suitable results for this installation. For other situations, the water particle motion generator will allow other adjustments. Changes in the disk mass will also vary the amplitude and energy imparted on the water, and input pressure will slightly change the frequency of the water particle motion.

Field tests with Atlantic salmon smolts were then performed to determine the field of influence of the water particle motion generator. This test was performed at the site where the water particle motion generators would be installed to ensure that many of the environmental factors for the final installation would be the same. The smolts were set in a floating net pen in the river. The water particle motion generator was set in the water outside the pen, and the net pen was moved nearer the generator. The fish were then observed over time and their distance from the generator was measured. A series of other measurements were subsequently taken with different separations between pen and generator. The effects of the orientation of the generator and pen to the river flow and lighted and shaded areas were also evaluated to determine the impact of these environmental factors. The impact of river velocity was quantified by measuring water velocity in the pen at each pen location. With this data, the water particle motion generators could be placed in a row so their influence fields overlapped and there was a completely ensonified barrier between the fish and the intake.

This method of experimentation would be utilized for each new series of pneumatic oscillator that is to be employed. The lab tests provide baseline data on the system and allow modifications to parameters that literature suspects will elicit avoidance responses in the fish to be controlled. At each new installation, these lab results would then be verified biologically with representative fish during field tests. These field tests would be performed at the location of the final installation, thus compensating for local environmental factors and assuring the final installation will work as planned.

CONCLUSION, RAMIFICATIONS, AND SCOPE OF INVENTION

Thus the reader will see that the invention provides a fish deterrent and guide with many advantages over the prior art in that:

the device is cost effective because of the use of commercially available components;

the device is easily tunable for various fish sizes and species by adjusting the oscillating plate size, mass, and the inlet and backpressures on the pneumatic oscillators;

the device can be tuned by the above mentioned technique to establish a continuous barrier to the fish;

the device is mechanically reliable because of the few moving parts in the system and because the piston is cushioned at the end of each stroke by a layer of compressed air;

the placement of the backpressure regultor above the water line allows the operation of the systems to be monitored above the water surface;

the hazard of electrical shock is reduced because of the use of compressed air;

the small size of the device makes it reasonably portable and deployable; and the small number of moving parts allow a device which is easy to maintain.

Although the description above contains many specificities, these should not be construed as limiting the scope of the invention but as merely providing illustrations of some of the presently preferred embodiments of this invention. For example, if the self-starting springs are used, the disk may be of any material. If the device is used in the vertical direction and with a disk of buoyant material, the self-starting springs may be eliminated. The device itself may be of any size, the oscillated plate can be of any shape and size, etc. Also, the device may not necessarily be fixed, but attached to a substantially massive mobile vessel, such as a boat. This would enable a series of these devices to effectively herd fish out of certain regions.

Thus the scope of the invention should be determined by the appended claims and their legal equivalents, rather than by the examples given.

I claim:

1. An apparatus for generating low frequency sound, infrasound, or water particle motion in order to deter and guide fish, comprising:

(a) a pneumatic oscillator attached to a substantially rigid structure (b) a disk attached to a piston of said pneumatic oscillator (d) a self-starting mechanism for said pneumatic oscillator (e) a system of regulators to adjust the frequency and amplitude of said water particle motion.

2. The pneumatic oscillator of claim 1 wherein a layer of compressed air cushions the redirection of said piston.

3. The apparatus of claim 1 wherein said disk is fabricated from low density material.

4. The apparatus of claim 1 wherein adjustment of said disk diameter and mass changes the amplitude, frequency and energy of said water particle motion.

5. The apparatus of claim 1 wherein said self-starting mechanism permits apparatus orientation in any direction.

6. The apparatus of claim 1 wherein adjustment of edge conditions of said disk alters energy in water particle motion and field of influence of water particle motion.

7. The apparatus of claim 1 wherein said system of regulators includes an inlet pressure regulator and a backpressure regulator.

8. The system of regulators of claim 7 wherein adjustment of the inlet pressure regulator changes the amplitude, frequency, and energy of said water particle motion.

9. The system of regulators of claim 7 wherein adjustment of the backpressure regulator changes the amplitude of said water particle motion.

10. The backpressure regulator of claim 9 wherein said backpressure regulator is located above the water surface to allow the full atmospheric pressure differential to act on the piston.

11. The backpressure regulator of claim 9 wherein said backpressure regulator is located above the water surface to provide a remote indicator to the operation of the apparatus.

* * * * *